US012767852B2

(12) United States Patent
Wang et al.

(10) Patent No.: US 12,767,852 B2
(45) Date of Patent: Oct. 20, 2026

(54) AQUEOUS COATING COMPOSITION AND PROCESS FOR PREPARING THE SAME

(71) Applicants: Dow Global Technologies LLC, Midland, MI (US); Rohm and Haas Company, Collegeville, PA (US)

(72) Inventors: Jinfei Wang, Shanghai (CN); Xiaohong Yang, Shanghai (CN); Linfei Wang, Shanghai (CN); Jia Tang, Shanghai (CN); Daoshu Lin, Shanghai (CN); Li Zhou, Shanghai (CN); Zhonghua Zhang, Shanghai (CN)

(73) Assignees: DOW CHEMICAL (CHINA) INVESTMENT COMPANY LIMITED, Shanghai (CN); ROHM AND HAAS COMPANY, Collegeville, PA (US)

( * ) Notice: Subject to any disclaimer, the term of this patent is extended or adjusted under 35 U.S.C. 154(b) by 365 days.

(21) Appl. No.: 18/698,604

(22) PCT Filed: Nov. 8, 2021

(86) PCT No.: PCT/CN2021/129352
§ 371 (c)(1),
(2) Date: Apr. 4, 2024

(87) PCT Pub. No.: WO2023/077518
PCT Pub. Date: May 11, 2023

(65) Prior Publication Data

US 2025/0236756 A1 Jul. 24, 2025

(51) Int. Cl.

| | |
|---|---|
| ***C09D 133/00*** | (2006.01) |
| ***C08F 220/14*** | (2006.01) |
| ***C08G 77/04*** | (2006.01) |
| ***C08K 5/25*** | (2006.01) |
| ***C09D 5/02*** | (2006.01) |
| ***C09D 7/20*** | (2018.01) |
| ***C09D 7/63*** | (2018.01) |
| ***C09D 7/80*** | (2018.01) |
| ***C09D 133/08*** | (2006.01) |

(52) U.S. Cl.
CPC .......... *C09D 133/08* (2013.01); *C08F 220/14* (2013.01); *C08G 77/045* (2013.01); *C08K 5/25* (2013.01); *C09D 5/022* (2013.01); *C09D 7/20* (2018.01); *C09D 7/63* (2018.01); *C09D 7/80* (2018.01)

(58) Field of Classification Search
CPC .......... C09D 133/08; C09D 7/20; C09D 7/63; C09D 7/80; C09D 5/022; C08F 220/14; C08G 77/045; C08K 5/25
USPC .......... 106/287.13
See application file for complete search history.

(56) References Cited

U.S. PATENT DOCUMENTS

| | | | |
|---|---|---|---|
| 5,300,286 | A | 4/1994 | Gee |
| 8,992,955 | B2 | 3/2015 | Ikebe et al. |
| 2017/0275408 | A1 | 9/2017 | Yang et al. |

FOREIGN PATENT DOCUMENTS

| | | | |
|---|---|---|---|
| CN | 100417374 | 9/2008 | |
| CN | 101831227 | 9/2010 | |
| CN | 104830177 | 8/2015 | |
| CN | 106928822 | 7/2017 | |
| CN | 109206993 | 1/2019 | |
| CN | 110256918 | 9/2019 | |
| WO | 2009079205 | 6/2009 | |
| WO | 2009102566 | 8/2009 | |
| WO | 2017036612 | 3/2017 | |
| WO | 2021134164 | 7/2021 | |
| WO | WO-2021134164 A1 * | 7/2021 | C09D 7/63 |

* cited by examiner

*Primary Examiner* — James E McDonough
(74) *Attorney, Agent, or Firm* — CANTOR COLBURN LLP

(57) ABSTRACT

An aqueous coating composition contains: (a) from 50% to 90%, by weight based on the weight of the aqueous coating composition, of a film-forming polymer; (b) from 4% to 90%, by weight based on the weight of the film-forming polymer, of an oligomer having a weight average molecular weight of less than 15,000 g/mol; where the oligomer comprises, by weight based on the weight of the oligomer, from 1% to 20% of structural units of an acid monomer, a salt thereof, or mixtures thereof; from zero to 20% of structural units of a monoethylenically unsaturated functional monomer carrying at least one of functional groups selected from an amide, carbonyl, ureido, silane, hydroxy, or amino group, or combinations thereof; from 30% to 99% of structural units of a hydrophilic monoethylenically unsaturated nonionic monomer; and from zero to 30% of structural units of a hydrophobic monoethylenically unsaturated nonionic monomer; and (c) from 4% to 15%, by weight based on the weight of the aqueous coating composition, of a specific silicone polyether copolymer.

11 Claims, No Drawings

AQUEOUS COATING COMPOSITION AND PROCESS FOR PREPARING THE SAME

FIELD

The present invention relates to an aqueous coating composition and a process for preparing the same.

INTRODUCTION

Aqueous or waterborne coating compositions are widely used in industrial and architectural applications as they contribute zero or less volatile organic compounds (VOCs) as compared to solvent-borne coatings. However, waterborne coatings have found limited acceptance in the wood finishing industry due to a phenomenon referred to in the art as "grain raising". Wood fibers on the surface of the wood absorb water and swell upon application of waterborne coating compositions. Thereafter, the wood fibers shrink as they dry resulting in wrinkles and/or roughness in the finished wood surface. This problem is exacerbated by the fact that fibers in one area of a wood surface can have different swelling properties than others, leading to varying degrees of surface roughness on any given finished surface. Loosened wood fibers can also protrude upward after absorbing water. When water evaporates from the wood fibers remain in their upright position, sanding is not able to completely remove the raised grain. Two-component waterborne polyurethane coating compositions can be used to improve anti-grain raising performance, but they have shorter pot life and more complicated handling problems as compared to one-component waterborne coating compositions. Moreover, sandability is another essential property for some coating applications such as primers to meet industry requirements.

Therefore, there remains a need to provide a one-component aqueous coating composition that is capable of suppressing grain raising of wood and offering coatings made therefrom with anti-grain raising performance and good sandability suitable for primer applications.

SUMMARY

The present invention provides an aqueous coating composition that is a novel combination of a specific oligomer and a specific silicone polyether copolymer with a film-forming polymer. The aqueous coating composition of the present invention can provide coatings with anti-grain raising performance as indicated by an anti-grain raising level of 4 or more and good sandability with rating of 3 or more. These properties may be measured according to the test methods described in the Examples section below.

In a first aspect, the present invention is an aqueous coating composition comprising:

(a) from 50% to 90%, by weight based on the weight of the aqueous coating composition, of a film-forming polymer;

(b) from 4% to 90%, by weight based on the weight of the film-forming polymer, of an oligomer having a weight average molecular weight of less than 15,000 g/mol, wherein the oligomer comprises, by weight based on the weight of the oligomer, from 1% to 20% of structural units of an acid monomer, a salt thereof, or mixtures thereof;

from zero to 20% of structural units of a monoethylenically unsaturated functional monomer carrying at least one of functional groups selected from an amide, carbonyl, ureido, silane, hydroxy, or amino group, or combinations thereof;

from 30% to 99% of structural units of a hydrophilic monoethylenically unsaturated nonionic monomer; and from zero to 30% of structural units of a hydrophobic monoethylenically unsaturated nonionic monomer; and (c) from 4% to 15%, by weight based on the weight of the aqueous coating composition, of a silicone polyether copolymer having the structure of formula (I):

$$R'\text{-}(CH_3)_2SiO\text{-}[(CH_3)_2SiO)]_x\text{-}[(CH_3)RSiO]_y\text{-}[(CH_3)_2SiO)]_z\text{-}Si(CH_3)_2\text{-}R' \quad (I)$$

where subscripts x, y and z have values such that x+y+z<24; R is $—(CH_2)a\text{-}(EO)b\text{-}(PO)c\text{-}(BO)d\text{-}OR_1$, where $R_1$ is H, $—CH_3$, or $CH_3CO—$; R' is $—(CH_2)_e(EO)_f(PO)_g—OH$, $—CH_3$, or $—CH_2CH_3$; subscript a is from 1 to 30, subscript b is from 1 to 30, subscript c is from zero to 30, subscript d is from zero to 30, subscript e is from zero to 30, subscript f is from zero to 30; EO is $—(CH_2CH_2—O)—$, and subscript g is from zero to 30; PO is $—(CHR_2—CHR_3—O)—$, where $R_2$ and $R_3$ are each independently hydrogen or $—CH_3$, provided that $R_2$ and $R_3$ together contain 1 carbon atom; and BO is $—(CHR_4—CHR_5—O)$, where $R_4$ and $R_5$ are each independently hydrogen, $—CH_3$, or $—CH_2CH_3$, provided that $R_4$ and $R_5$ together contain 2 carbon atoms.

In a second aspect, the present invention is a process for preparing the aqueous coating composition of the first aspect. The process comprises: admixing the film-forming polymer, the oligomer, and the silicone polyether copolymer.

DETAILED DESCRIPTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods.

Products identified by their tradename refer to the compositions available under those tradenames on the priority date of this document. "And/or" means "and, or as an alternative". All ranges include endpoints unless otherwise indicated.

"Aqueous" composition or dispersion herein means that polymers or particles dispersed or dissolved in an aqueous medium. By "aqueous medium" herein is meant water and from zero to 30%, by weight based on the weight of the medium, of water-miscible compound(s) such as, for example, alcohols, glycols, glycol ethers, glycol esters, or mixtures thereof.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

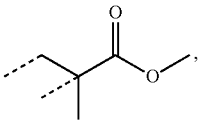

where the dotted lines represent the points of attachment of the structural unit to the polymer backbone.

Determine chemical structure for silicone polyether copolymers by standard $^1H$, $^{13}C$ and $^{29}Si$ nuclear magnetic resonance (NMR) analysis.

"Acrylic polymer" or "polyacrylic" herein refers to a homopolymer of an acrylic monomer or a copolymer of an acrylic monomer with a different acrylic monomer or other monomers such as styrene and vinyl acetate. "Acrylic monomer" as used herein includes (meth)acrylic acid, alkyl (meth)acrylate, (meth)acrylamide, (meth)acrylonitrile and their modified forms such as hydroxyalkyl (meth)acrylate. Throughout this document, the word fragment "(meth)acryl" refers to both "methacryl" and "acryl". For example, (meth) acrylic acid refers to both methacrylic acid and acrylic acid, and methyl (meth)acrylate refers to both methyl methacrylate and methyl acrylate.

"Nonionic monomers" herein refers to monomers that do not bear an ionic charge between pH=1-14.

The term "calculated Hansch parameter" for any molecule refers to a parameter representing an index of polymer hydrophobicity, with higher values indicating greater hydrophobicity, as calculated according to the Kowwin methodology. A tool for this can be downloaded at https://www.epa.gov/tsca-screening-tools/epi-suitetm-estimation-program-interface. The Kowwin methodology uses a corrected "fragment constant" methodology to predict the Hansch parameter, expressed as log P. For any molecule, the molecular structure is divided into fragments each having a coefficient and all coefficient values in the structure are summed together to yield the log P estimate for the molecule. Fragments can be atoms but are larger functional groups (e.g., C═O) if the groups give a reproducible coefficient. The coefficients for each individual fragment were derived by multiple regression of reliably measured log P values (KOWWIN's "reductionist" fragment constant methodology), wherein the log P is measured by testing the fragment in a mixture of water and a given hydrophobic organic solvent. In the corrected fragment constant methodology, the coefficients of groups are adjusted by a correction factor to account for any differences between a measured log P coefficient value of a group and a log P for the same group that would result from summing the estimated log P coefficients from all atoms in the group alone. The KOWWIN calculation tool and estimation methodology were developed at Syracuse Research Corporation. Hansch values of some commonly used monomers are as follows: 0.99 (methacrylic acid), 0.44 (acrylic acid), 1.28 (methyl methacrylate), 2.20 (butyl acrylate), −0.05 (diacetone acrylamide), 4.64 (2-ethylhexyl acrylate), 2.89 (styrene), 0.22 (phosphoethyl methacrylate), 2.75 (butyl methacrylate), 0.24 (acetoacetoxyethyl methacrylate), 0.73 (methyl acrylate), and 6.68 (lauryl methacrylate).

The aqueous coating composition of the present invention comprises one or more oligomers. The oligomer may comprise structural units of one or more acid monomers, salts thereof, or mixtures thereof. Suitable acid monomers and salts thereof may include, for example, carboxylic acid monomers, sulfonic acid monomers, phosphorous-containing acid monomers, salts thereof, or mixtures thereof. The carboxylic acid monomers can be α,β-ethylenically unsaturated carboxylic acids, monomers bearing an acid-forming group which yields or is subsequently convertible to, such an acid group (such as anhydride, (meth)acrylic anhydride, or maleic anhydride); or mixtures thereof. Specific examples of carboxylic acid monomers include acrylic acid, methacrylic acid, maleic acid, itaconic acid, crotonic acid, fumaric acid, 2-carboxyethyl acrylate, or mixtures thereof. Examples of suitable phosphorous-containing acid monomers and salts thereof include phosphoalkyl (meth)acrylates such as phosphoethyl (meth)acrylate, phosphopropyl (meth)acrylate, phosphobutyl (meth)acrylate, salts thereof, and mixtures thereof; $CH_2{=}C(R_{p1})—C(O)—O—(R_{p2}O)_q—P(O)(OH)_2$, wherein $R_{p1}$=H or $CH_3$, $R_{p2}$=alkylene, such as an ethylene group, a propylene group, a butylene group, or a combination thereof; and q=1-20, such as SIPOMER PAM-100, SIPOMER PAM-200, SIPOMER PAM-300, SIPOMER PAM-600 and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers and salts thereof are selected from the group consisting of phosphoethyl (meth) acrylate, phosphopropyl (meth)acrylate, phosphobutyl (meth)acrylate, allyl ether phosphate, salts thereof, or mixtures thereof; more preferably, phosphoethyl methacrylate (PEM). The sulfonic acid monomers and salts thereof may include sodium vinyl sulfonate (SVS), sodium styrene sulfonate (SSS), acrylamido-methyl-propane sulfonate (AMPS), or mixtures thereof. The oligomer may comprise structural units of the acid monomer, the salt thereof, or mixtures thereof, at a concentration of 1% or more, and can be 2% or more, 3% or more, 4% or more, 5% or more, 6% or more, 7% or more, 8% or more, 9% or more, or even 10% or more, while at the same time is generally 20% or less, and can be 18% or less, 17% or less, 16% or less, 15% or less, 14% or less, 12% or less, 10% or less, 8% or less, or even 5% or less, by weight based on the weight of the oligomer.

The oligomer useful in the present invention may comprise or be free of structural units of one or more monoethylenically unsaturated functional monomers carrying at least one of functional groups selected from an amide, carbonyl, ureido, silane, hydroxy, or amino group, or combinations thereof. Suitable monoethylenically unsaturated functional monomers may include, for example, amino-functional monomers such as dimethylaminoethyl methacrylate, dimethylaminoethyl acrylate, dimethylaminopropyl methacrylate, dimethylaminopropyl acrylate; monomers bearing carbonyl-containing groups including acetoacetate-functional monomers such as acetoacetoxyethyl methacrylate (AAEM), acetoacetoxyethyl acrylate, acetoacetoxypropyl methacrylate, acetoacetoxypropyl acrylate, allyl acetoacetate, acetoacetoxybutyl methacrylate, acetoacetoxybutyl methacrylate, acetoacetamidoethyl methacrylate, and acetoacetamidoethyl acrylate; diacetone acrylamide (DAAM) and diacetone methacrylamide; monomers bearing amide-functional groups such as acrylamide and methacrylamide; vinyltrialkoxysilanes such as vinyltrimethoxysilane, vinyltriethoxysilane, vinyltris(2-methoxyethoxy)silane, vinyldimethylethoxysilane vinylmethyldiethoxysilane or (meth)acryloxyalkyltrialkoxysilanes such as (meth)acryloxyethyltrimethoxysilane and (meth)acryloxypropyltrimethoxysilane; hydroxy-functional alkyl (meth)acrylates such as 2-hydroxyethyl (meth)acrylate and hydroxypropyl (meth)acrylate; or mixtures thereof. Desirably, the monoethylenically unsaturated functional monomer is selected from diacetone acrylamide or acetoacetoxyethyl methacrylate. The oligomer may comprise structural units of the monoethylenically unsaturated functional monomer at a concentration of zero or more, and can be 0.1% or more, 0.5% or more, 1% or more, 1.5% or more, 2% or more, 2.5% or more, 3% or more, or even 3.5% or more, while at the same time is generally 20% or less, and can be 18% or less, 16% or less, 15% or less, 14% or less, 12% or less, 10% or less, 8% or less, 5% or less, 4% or less, or even 3.5% or less, by weight based on the weight of the oligomer.

The oligomer useful in the present invention may comprise structural units of one or more hydrophilic monoethylenically unsaturated nonionic monomers that are other than the monoethylenically unsaturated functional monomers described above. "Hydrophilic" monomer refers to a monomer with a calculated Hansch parameter less than 2.2 (<2.2).

The hydrophilic monoethylenically unsaturated nonionic monomers may include $C_1$-$C_3$-alkyl esters of (meth)acrylic acid, and preferably, $C_1$-$C_2$-alkyl esters of (meth)acrylic acid Examples of suitable hydrophilic monoethylenically unsaturated nonionic monomers include methyl (meth)acrylate, ethyl (meth)acrylate, or mixtures thereof; and preferably, methyl methacrylate, ethyl acrylate, or mixtures thereof. The oligomer may comprise structural units of the hydrophilic monoethylenically unsaturated nonionic monomer at a concentration of 30% or more, and can be 35% or more, 40% or more, 45% or more, 50% or more, 55% or more, 60% or more, 65% or more, 66.5% or more, or even 70% or more, while at the same time is generally 99% or less, and can be 98% or less, 95% or less, 93% or less, 92% or less, 90% or less, 88% or less, or even 86.5% or less, by weight based on the weight of the oligomer.

The oligomer useful in the present invention may comprise or be free of structural units of one or more hydrophobic monoethylenically unsaturated nonionic monomers that are other than the monoethylenically unsaturated functional monomers described above. "Hydrophobic" monomer refers to a monomer having a calculated Hansch parameter ≥2.2. The hydrophobic monoethylenically unsaturated nonionic monomers may include vinyl aromatic monomers such as styrene and substituted styrene, $C_4$-$C_{20}$-alkyl esters of (meth)acrylic acid such as butyl (meth)acrylate, 2-ethylhexyl (meth)acrylate, lauryl (meth)acrylate, stearyl (meth) acrylate, or mixtures thereof. The oligomer may comprise structural units of the hydrophobic monoethylenically unsaturated nonionic monomer at a concentration of zero or more, and can be 1% or more, 5% or more, 10% or more, 15% or more, or even 20% or more, while at the same time is generally 30% or less, and can be 28% or less, 25% or less, 22% or less, 20% or less, 18% or less, 15% or less, 12% or less, 10% or less, 8% or less, 5% or less, 2% or less, or even 1% or less, by weight based on the weight of the oligomer.

The oligomer useful in the present invention may comprise, by weight based on the weight of the oligomer, from 7% to 15% of structural units of the acid monomer, the salt thereof, or mixtures thereof, from 60% to 92% of structural units of the hydrophilic monoethylenically unsaturated nonionic monomer, from 1% to 5% of structural units of the monoethylenically unsaturated functional monomer such as diacetone acrylamide or acetoacetoxyethyl methacrylate, and from zero to 20% of structural units of the hydrophobic monoethylenically unsaturated nonionic monomer.

The oligomer useful in the present invention may have a weight average molecular weight (Mw) of less than 15,000 grams per mole (g/mol), and can be 14,500 g/mol or less, 14,000 g/mol or less, 13,500 g/mol or less, 13,000 g/mol or less, 12,500 g/mol or less, 12,000 g/mol or less, 11,500 g/mol or less, or even 11,000 g/mol or less, while at the same time is generally 2,000 g/mol or more, and can be 2,500 g/mol or more, 3,000 g/mol or more, 3,500 g/mol or more, 4,000 g/mol or more, 4,500 g/mol or more, 5,000 g/mol or more, 5,500 g/mol or more, 6,000 g/mol or more, 6,500 g/mol or more, 7,000 g/mol or more, 7,500 g/mol or more, 8,000 g/mol or more, or even 8,500 g/mol or more, as determined by gel permeation chromatography (GPC) analysis using a polystyrene standard (further details provided below under GPC Analysis). Depending on its molecular weight, the oligomer can be in the form of an aqueous solution or an aqueous dispersion.

The oligomer in the aqueous coating composition of the present invention may be present at a concentration of 4.0% or more, and can be 4.5% or more, 5% or more, 6% or more, 7% or more, 8% or more, 9% or more, 10% or more, 12% or more, 15% or more, 18% or more, or even 20% or more, while at the same time is generally at a concentration of 90% or less, and can be 85% or less, 80% or less, 75% or less, 70% or less, 65% or less, 60% or less, 55% or less, 50% or less, 45% or less, 40% or less, 35% or less, 30% or less, 25% or less, 20% or less, or even 15% or less, by weight based on the weight of the film-forming polymer described below. Weight percentage herein refers to the dry weight of the oligomer relative to the dry weight of the film-forming polymer.

The process for preparing the oligomer useful in the present invention can be conducted by free-radical polymerization, such as suspension polymerization, solution polymerization or emulsion polymerization, of the monomers described above. Emulsion polymerization is a preferred process. Total weight concentration of structural units of the oligomer is equal to 100% relative to the weight of the oligomer. Total weight concentration of monomers for preparing the oligomer is equal to 100% relative to the total weight of monomers. A mixture of monomers for preparing the oligomer may be added neat or as an emulsion in water; or added in one or more addition or continuously, linearly or nonlinearly, over the reaction period of preparing the oligomer, or combinations thereof. Temperature suitable for emulsion polymerization processes may be lower than 100° C. in the range of from 30 to 95° C., or in the range of from 50 to 90° C. Multistage free-radical polymerization using the monomers described above can be used, which at least two stages are formed sequentially, and usually results in the formation of the multistage polymer comprising at least two polymer compositions.

In the polymerization process for preparing the oligomer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process for preparing the oligomer, a surfactant may be used. The surfactant may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The surfactant used is usually at a concentration of from 0.1% to 6% or from 0.3% to 1.5%, by weight based on the weight of total monomers used for preparing the oligomer.

In the polymerization process for preparing the oligomer, a train transfer agent may be used. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the oligomer, for example, at a concentration of greater than 1.2%, and can be 1.3% or more, 1.4% or more, 1.5% or more, 1.6% or more, 1.7% or more, 1.8% or more, or even 1.9% or more, while at the same time is generally 10% or less, 9% or less, 8% or less, 7% or less, 6% or less, 5% or less, or even 4% or less, by weight based on the total weight of monomers used for preparing the oligomer.

After completing the polymerization of the oligomer, the obtained oligomer may be controlled to a pH value of at least 6, for example, from 6 to 11, or from 7 to 10, by neutralization. Neutralization may be conducted by adding one or more bases which may lead to partial or complete neutralization of the ionic or latently ionic groups of the oligomer. Examples of suitable bases include ammonia: alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The aqueous coating composition of the present invention also comprises one or more film-forming polymers (also known as "binders"), typically in the form of an emulsion or an aqueous dispersion. "Film-forming polymer" herein refers to a polymer having higher weight average molecular weight than the oligomer described above. The film-forming polymer useful in the present invention may have a weight average molecular weight of 30,000 g/mol or more, and can be 40,000 g/mol or more, 50,000 g/mol or more, 60,000 g/mol or more, 70,000 g/mol or more, 80,000 g/mol or more, 90,000 g/mol or more, 100,000 g/mol or more, 120,000 g/mol or more, 150,000 g/mol or more, 180,000 g/mol or more, or even 200,000 g/mol or more, as determined by GPC analysis using a polystyrene standard (further details provided below under GPC Analysis). The aqueous dispersion of the film-forming polymer may have a minimum film formation temperature (MFFT) in the range of from 0 to 70° C., from 10 to 60° C., or from 20 to 55° C., as determined according to ASTM D 2354-10 (2018). The film-forming polymer particles may have an average particle size of from 30 nanometers (nm) to 500 nm, from 70 nm to 300 nm, or from 70 nm to 250 nm. Particle size of the film-forming polymer can be determined by Brookhaven BI-90 Plus Particle Size Analyzer.

The film-forming polymer in the aqueous coating composition of the present invention may be selected from an acrylic polymer including, for example, an acrylic homopolymer, an acrylic copolymer, a styrene-acrylic copolymer, an acrylic-vinyl acetate copolymer, or mixtures thereof. The acrylic polymer, typically an emulsion polymer, may comprise structural units of one or more monoethylenically unsaturated nonionic monomers. Suitable monoethylenically unsaturated nonionic monomers may include those hydrophilic and hydrophobic monoethylenically unsaturated nonionic monomers described in the oligomer section above. The acrylic polymer may comprise, by weight based on the weight of the acrylic polymer, from 75% to 90% or from 80% to 85% of structural units of the monoethylenically unsaturated nonionic monomer. The acrylic polymer may comprise or be free of structural units of one or more acid monomers, salts thereof, or mixtures thereof. Suitable acid monomers and salts thereof herein may include those described in the oligomer section above. The acrylic polymer may comprise, by weight based on the weight of the acrylic polymer, from zero to 15% of structural units of the acid monomer, the salt thereof or mixtures thereof, for example, from 0.1% to 10%, from 0.5% to 8%, from 1% to 6%, from 1.5% to 5%, or from 2% to 4%. The acrylic polymer may comprise or be free of structural units of one or more multiethylenically unsaturated monomers including di-, tri-, tetra-, or higher multifunctional ethylenically unsaturated monomers. Examples of suitable multiethylenically unsaturated monomers include butadiene, allyl (meth) acrylate, divinyl benzene, ethylene glycol dimethacrylate, butylene glycol dimethacrylate, or mixtures thereof. The acrylic polymer may comprise, by weight based on the weight of the acrylic polymer, from zero to 5%, from 0.1% to 3%, or from 0.5% to 1.5% of structural units of the multiethylenically unsaturated monomer. The acrylic polymer useful in the present invention may have a Tg of greater than 30° C., and can be 32° C. or more, 35° C. or more, 38° C. or more, or even 40° C. or more, while at the same time is generally 70° C. or less, and can be 65° C. or less, 60° C. or less, 55° C. or less, 50° C. or less, or even 45° C. or less. Tg can be measured by differential scanning calorimetry (DSC) (further details provided under DSC below).

The aqueous coating composition of the present invention may comprise the film-forming polymer at a concentration of 50% or more, 55% or more, 60% or more, 65% or more, or even 70% or more, while at the same time is generally 90% or less, 85% or less, 80% or less, 75% or less, 70% or less, 65% or less, or even 55% or less, by weight based on the weight of the aqueous coating composition.

The aqueous coating composition of the present invention comprises one or more silicone polyether copolymers having the structure of formula (I):

$$R'\text{-}(CH_3)_2SiO\text{-}[(CH_3)_2SiO)]_x\text{-}[(CH_3)RSiO]_y\text{-}[(CH_3)_2SiO)]_z\text{-}Si(CH_3)_2\text{-}R' \quad (I)$$

where subscripts x, y and z have values such that x+y+z<24; R is $—(CH_2)_a\text{-}(EO)_b—(PO)_c—(BO)_d—OR_1$, where $R_1$ is H, $—CH_3$, or $CH_3CO—$; R' is $—(CH_2)_e(EO)_f(PO)_g—OH$, $—CH_3$, or $—CH_2CH_3$; subscript a is from 1 to 30, subscript b is from 1 to 30, subscript c is from zero to 30, subscript d is from zero to 30, subscript e is from zero to 30, subscript f is from zero to 30, and subscript g is from zero to 30; EO (also as "ethylene oxide group") is $—(CH_2CH_2—O)—$; PO (also as "propylene oxide group") is $—(CHR_2—CHR_3—O)—$, where $R_2$ and $R_3$ are each independently hydrogen or $—CH_3$, provided that $R_2$ and $R_3$ together contain 1 carbon atom; and BO is $—(CHR_4—CHR_5—O)$, where $R_4$ and $R_5$ are each independently hydrogen, $—CH_3$, or $—CH_2CH_3$, provided that $R_4$ and $R_5$ together contain 2 carbon atoms.

The value of x+y+z can be 23 or less, 22 or less, 20 or less, 21 or less, 19 or less, 18 or less, 16 or less, 15 or less, 14 or less, 13 or less, or even 12 or less, while at the same time is generally 1 or more, 2 or more, 3 or more, 5 or more, 7 or more, 9 or more, 12 or more, 13 or more, or even 15 or more. Desirably, the value of x+y+z is in a range of from 1 to 15. Subscript x can be in a range of from zero to 23, subscript y can be from 1 to 23, and subscript z can be from zero to 21. For example, subscript x can be zero or more, 1 or more, 2 or more, 3 or more, 4 or more, 5 or more, 6 or more, 7 or more, 8 or more, or even 9 or more, while at the same time is generally 23 or less, 20 or less, 18 or less, 15 or less, 13 or less, 12 or less, 10 or less, or even 9 or less. Subscript y can be 1 or more, 2 or more, 30r more, or even 4 or more, while at the same time is generally 23 or less, and can be 20 or less, 15 or less, 10 or less, 5 or less, or even 4 or less. Subscript z can be zero or more, and can be 1 or more, 2 or more, 3 or more, 4 or more, 5 or more, 6 or more, 7 or more, 8 or more, or even 9 or more, while at the same time is generally 21 or less, and can be 20 or less, 18 or less, 15 or less, 13 or less, 12 or less, 10 or less, or even 9 or less.

Subscript a can be 1 or more, 2 or more, or even 3 or more, while at the same time is generally 30 or less, and can be 25 or less, 20 or less, 15 or less, 12 or less, 10 or less, 8 or less, 5 or less, or even 3 or less. Subscript b can be 1 or more, 2 or more, 3 or more, 4 or more, 5 or more, 6 or more, or even 7 or more, while at the same time is generally 30 or less, and can be 28 or less, 25 or less, 22 or less, 20 or less, 18 or less, 16 or less, 14 or less, 12 or less, 10 or less, or even 7 or less. Subscript c can be zero or more, and can be 1 or more, 2 or more, 3 or more, 4 or more, 5 or more, 6 or more, or even 7 or more, while at the same time is generally 30 or less, and can be 28 or less, 25 or less, 22 or less, 20 or less, 18 or less, 16 or less, 14 or less, 12 or less, 10 or less, or even 7 or less. Subscript d can be zero or more, and can be 1 or more, and can be 2 or more, 3 or more, 4 or more, 5 or more, 6 or more, or even 7 or more, while at the same time is generally 30 or less, and can be 28 or less, 25 or less, 22 or less, 20 or less, 18 or less, 16 or less, 14 or less, 12 or less, 10 or less, or even 7 or less. Subscript e can be zero or more, and can be 1 or more, 2 or more, or even 3 or more, while at the same time is generally 30 or less, and can be 25 or less, 20 or less, 15 or less, 12 or less, 10 or less, 8 or less, 5 or less, or even 3 or less. Subscript f can be zero or more, 1 or more, 2 or more, or even 3 or more, while at the same time is generally 30 or less, and can be 25 or less, 20 or less, 15 or less, 12 or less, 10 or less, 8 or less, 5 or less, or even 3 or less. Subscript g can be zero or more, and can be 1 or more, 2 or more, 3 or more, 4 or more, 5 or more, 6 or more, or even 7 or more, while at the same time is generally 30 or less, and can be 28 or less, 25 or less, 22 or less, 20 or less, 18 or less, 16 or less, 14 or less, 12 or less, 10 or less, or even 7 or less.

Suitable commercially available silicone polyether copolymers include those available under tradenames DOWSIL available from The Dow Chemical Company.

The aqueous coating composition of the present invention may comprise the silicone polyether copolymer at a concentration of 4% or more, and can be 4.2% or more, 4.5% or more, 4.8% or more, 5% or more, 5.2% or more, 5.5% or more, 5.8% or more, 6.0% or more, 6.2% or more, 6.5% or more, 6.8% or more, 7.0% or more, 7.2% or more, 7.5% or more, 7.8% or more, 8.0% or more, 8.5% or more, 9.0% or more, 9.5% or more, or even 10% or more, while at the same time is generally at a concentration of 15% or less, and can be 14.5% or less, 14% or less, 13.5% or less, 13% or less, 12.5% or less, 12% or less, 11.5% or less, 11% or less, 10.5% or less, or even 10% or less, by weight based on the weight of the aqueous coating composition.

The aqueous coating composition of the present invention may comprise a polyfunctional carboxylic hydrazide containing at least two hydrazide groups per molecule. The polyfunctional carboxylic hydrazides may act as a cross-linker and may be selected from adipic dihydrazide, oxalic dihydrazide, isophthalie dihydrazide, polyacrylic polyhydrazide, or mixtures thereof. The concentration of the polyfunctional carboxylic hydrazide may be from 0.5% to 10%, from 1% to 8%, or from 1.5% to 6%, by weight based on the weight of the oligomer.

The aqueous coating composition of the present invention may comprise or be free of one or more pigments. Pigments may include particulate inorganic materials which are capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. The aqueous coating composition may comprise or be free of one or more extenders. Extenders may include particulate inorganic materials typically having a refractive index of less than or equal to 1.8 and greater than 1.5. Examples of suitable extenders include calcium carbonate, aluminum oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. Pigments and extenders useful in the present invention typically have a d50 particle size of from 0.1 to 4 micrometers (μm), from 0.1 to 2 μm, from 0.1 to 1 μm, from 0.3 to 0.6 μm. The pigment and/or extender may be present, by weight based on the weight of the aqueous coating composition, at a concentration of from zero to 40%, from 5% to 30%, from 10% to 25%, or from 15% to 20%.

The aqueous coating composition of the present invention may comprise or be free of one or more defoamers. "Defoamers" herein refers to chemical additives that reduce and hinder the formation of foam. Defoamers may be silicone-based defoamers that are other than the silicone polyether copolymer described above, mineral oil-based defoamers, ethylene oxide/propylene oxide-based defoamers, alkyl polyacrylates, or mixtures thereof. The defoamer may be present at a concentration of from zero to 3%, from 0.01% to 2%, or from 0.1% to 1%, by weight based on the weight of the aqueous coating composition.

The aqueous coating composition of the present invention may comprise or be free of one or more thickeners (also known as "rheology modifiers"). Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxydebutyl methyl cellulose, 2-hydroxyethyl ethyl cellulose, and 2-hydoxypropyl cellulose, and preferably HEUR. The thickener may be present at a concentration of from zero to 5%, from 0.01% to 4%, or from 0.1% to 3%, by weight based on the weight of the aqueous coating composition.

The aqueous coating composition of the present invention may comprise or be free of one or more wetting agents. "Wetting agents" herein refer to chemical additives that reduce the surface tension of a coating composition, causing the aqueous coating composition to more easily spread across or penetrate the surface of a substrate. Wetting agents, which are different from the silicone polyether copolymer described above, may be polycarboxylates, anionic, zwitterionic, or non-ionic. The wetting agent may be present at a concentration of from zero to 3%, from 0.01% to 2%, or from 0.1% to 1%, by weight based on the weight of the aqueous coating composition.

The aqueous coating composition of the present invention may comprise or be free of one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present at a concentration of from zero to 12%, from 0.1% to 10%, or from 1% to 7%, by weight based on the weight of the aqueous coating composition.

The aqueous coating composition of the present invention may comprise water typically present at a concentration of from 30% to 90%, from 40% to 85%, or from 50% to 80%, by weight based on the weight of the aqueous coating composition.

In addition to the components described above, the aqueous coating composition of the present invention may further comprise any one or combination of the following additives: buffers, neutralizers, dispersants, humectants, biocides, anti-skinning agents, colorants, flowing agents, anti-oxidants, plasticizers, freeze/thaw additives, leveling agents, thixotropic agents, adhesion promoters, anti-scratch additives, and grind vehicles. These additives may be present in a total concentration of from zero to 5%, from 0.001% to 3%, or from 0.1% to 2%, by weight based on the weight of the aqueous coating composition.

The aqueous coating composition of the present invention may be prepared with techniques known in the coating art, for example, by admixing the film-forming polymer, the oligomer, the silicone polyether copolymer with other optional components described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the coating composition can dry, or allow to dry, to form a film (this is, coating) at room temperature (20-25° C.), or at an elevated temperature, for example, from 35° C. to 60° C.

The aqueous coating composition of the present invention can be applied to, and adhered to, various substrates, particularly wood. The aqueous coating composition is particularly suitable as a primer for wood coatings, such as furniture coatings, joinery coatings, and floor coatings. The aqueous coating composition can provide coating films obtained therefrom (i.e., the coatings after drying, or allowing to dry, the aqueous coating composition applied to a substrate) with good anti-grain raising property on a wood substrate such as xylosma or rubberwood substrate. The coatings on the wood substrate typically have two layers with a total dry film thickness of 50~60 μm. "Good anti-grain raising property" or "improved anti-grain raising property" in the present invention refers to an anti-grain raising level of at least 4. The coatings may also show good sandability with a rating of 3 or more. These properties may be measured according to the test methods described in the Examples section below.

The present invention also provides a process for preparing a coating. The process may comprise: forming the aqueous coating composition of the present invention, applying the aqueous coating composition to a substrate, preferably, the aqueous coating composition directly contacts with the surface of the substrate; and drying, or allowing to dry, the applied coating composition to form the coating. The aqueous coating composition can be used alone, or in combination with other coatings to form multi-layer coatings.

The present invention also provides a method of suppressing grain raising on a wood substrate subsequently coated with an aqueous top coating composition, comprising: applying the aqueous coating composition of the present invention to the wood substrate and drying the applied aqueous coating composition, prior to application of the aqueous top coating composition. The aqueous coating composition of the present invention is useful as a primer composition forming a primer coating. The aqueous top coating composition useful in the method is typically any conventional top coating composition that is different from the aqueous coating composition of the present invention. The aqueous top coating composition may comprise the film-forming polymer described above as a binder, including, for example, ROSHIELD™ 3311 acrylic polymer emulsion available from The Dow Chemical Company (ROSHIELD is a trademark of The Dow Chemical Company). The method may further comprise drying the aqueous top coating to form a top coating with a dry film thickness of 30±5 μm. The method of suppressing grain raising of the present invention may comprise repeating the steps of applying and drying the aqueous coating composition of the present invention, prior to the application of the aqueous top coating composition. The aqueous coating composition of the present invention may form coatings with a total dry film thickness of 50~60 μm. The coated substrate obtained therefrom comprises a multi-layer coating with improved anti-grain raising property above.

EXAMPLES

Some embodiments of the invention will now be described in the following Examples, wherein all weight percentage (wt %) of silicone polyether copolymer is relative to the aqueous coating composition weight and wt % of oligomer is relative to the acrylic copolymer weight, unless otherwise specified. The materials for use in the aqueous coating composition of the samples described herein below. Note: "Me" refers to a methyl group. "Ac" refers to $CH_3CO$—, "EO" refers to ethylene oxide group. "PO" refers to propylene oxide group. ROSHIELD, DOWANOL, ACRYSOL and DOWSIL are trademarks of The Dow Chemical Company.

Methyl methacrylate (MMA), butyl acrylate (BA), methacrylic acid (MAA), styrene (ST), methyl 3-mercaptopropanoate (MMP), ammonium persulfate (APS), $Na_2CO_3$, and ammonia are all available from Sinoreagent Group.

Diacetone acrylamide (DAAM) is available from Kyowa Hakko Chemical Co., Ltd.

DISPONIL Fes-32, available from BASF, is a fatty alcohol ether sulphate, sodium salt.

ROSHIELD™ 3311 acrylic polymer emulsion (solids: 40%) ("RS3311") is available from The Dow Chemical Company.

DOWANOL™ DPM coalescent (Dipropylene glycol methyl ether) ("DPM") and DOWANOL DPnB coalescent (Ethylene glycol monobutyl ether) ("DPnB") are both available form The Dow Chemical Company.

BYK346, available from BYK, is a silicone-containing wetting agent.

TEGO Airex 902W defoamer, available from BYK, is a polyether modified siloxane.

ACRYSOL™ RM-8W and ACRYSOL RM-5000 nonionic urethane rheology modifiers are available from The Dow Chemical Company.

BY16855, available from BASF, has the structure below:

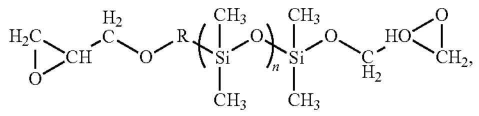

where n=1~3 and R=—$(CH_2CH_2O)_x$—Ac, x=1~100.

Below materials given in Table 1 are all commercially available from The Dow Chemical Company.

| Abbreviation | Chemical description |
|---|---|
| DOWSIL ™ OP-8550 additive | Amino functional polydimethylsiloxane |
| SPE-1 | $Me_3SiO(Me_2SiO)_{13}(MeSiRO)_2SiMe_3$, where R = —$(CH_2)_3$—$(EO)_{15}$—H |
| SPE-2 | $Me_3SiO(Me_2SiO)_{22}(MeSiRO)_2SiOMe_3$, where R = —$(CH_2)_3(EO)_{12}OAc$ |
| SPE-3 | $Me_3SiO(MeSiRO)_1SiMe_3$, where R = —$(CH_2)_3(EO)_7OH$ |
| SPE-4 | $Me_3SiO(MeSiRO)_1SiMe_3$, where R = —$(CH_2)_3(EO)_7OAc$ |
| SPE-5 | $Me_3SiO(MeSiRO)_1SiMe_3$, where R = —$(CH_2)_3(EO)_7OMe$ |
| SPE-6 | $Me_3SiO(MeSiRO)_1SiMe_3$, where R = —$(CH_2)_3(EO)_{12}OH$ |
| SPE-7 | $Me_3SiO(Me_2SiO)_9(MeSiRO)_4SiOMe_3$, where R = —$(CH_2)_3(EO)_{12}OAc$ |
| SPE-8 | HO—R'OSi$(Me_2SiO)_{13}(MeSiRO)_2$SiOR'—OH, where R = —$(CH_2)_3(EO)_{12}OAc$ and R' = —$CH_2$— |
| SPE-9 | R'OSi$(Me_2SiO)_{12}$SiOR', where R' = —$(CH_2)_3(EO)_{20}(PO)_{20}OH$ |

The following standard analytical equipment and methods are used in the Examples and in determining the properties and characteristics stated herein:

Solids Content

The solids content of an oligomer or acrylic polymer dispersion or solution sample was determined by weighing 0.7±0.1 gram (g) of a sample (wet weight of the sample is denoted as "W1"), putting the sample into an aluminum pan (weight of aluminum pan is denoted as "W2") in an oven at 150° C. for 25 minutes (min), and then cooling and weighing the aluminum pan with the dried sample with total weight denoted as "W3". "W3-W2" refers to dry or solids weight of the sample. The solids content is calculated by (W3−W2)/W1*100%.

Particle Size

Determine particle size by using Brookhaven BI-90 Plus Particle Size Analyzer.

GPC Analysis

Molecular weight of a polymer or oligomer sample was measured by GPC analysis. The GPC analysis was performed generally by an Agilent 1200. The sample was dissolved in tetrahydrofuran (THF)/formic acid (FA) (5%) with a concentration of 2 mg/mL (milligram per milliliter) and then filtered through a 0.45 μm polytetrafluoroethylene (PTFE) filter prior to GPC analysis. The GPC analysis was conducted using the following conditions:

Column: Two Mixed B columns (7.8 mm (millimeter)×300 mm) in tandem; column temperature: 35° C.; mobile phase: THF/FA (5%); flow rate: 1.0 mL/min; Injection volume: 100 μL; detector: Agilent Refractive Index detector, 35° C.; and calibration curve: PL Polystyrene (PS) Narrow standards (Part No.: 2010-0101) with PS equivalent molecular weights ranging from 2329000 to 162 g/mol.

DSC

A 5-10 mg sample was analyzed in a sealed aluminum pan on a TA Instrument DSC Q2000 fitted with an auto-sampler under nitrogen ($N_2$) atmosphere. Tg measurement was conducted with three cycles including, from −50 to 200° C., 10° C./min (1st cycle, then hold for 5 min to erase thermal history of the sample), from 200 to −50° C., 10° C./min (2nd cycle), and from −50 to 200° C., 10° C./min (3rd cycle). Tg was obtained from the 3rd cycle by taking the mid-point in the heat flow versus temperature transition as the Tg value.

Viscosity Measurement

Determine viscosities of oligomers using Brookfield viscometer LVDV-I Prime according to the following parameters: LV Spindle #1, 60 revolutions per minute (RPM), 25° C.; 10-100 centipoises (cP); LV Spindle #2, 60 RPM, 25° C.; 50-500 cP; LV Spindle #3, 60 rpm, 25° C.; 200-2,000 cP; and LV Spindle #4, 60 rpm, 25° C.; 1,000-10,000 cP.

Anti-Grain Raising Characterization

An aqueous coating composition sample was applied on rubberwood at 80-90 gram per square meter (g/m$^2$) and then dried at room temperature for 2 hours, followed by sanding the resulting coating film ("first coating"). A second layer of the coating composition sample was further applied to the first coating at 80-90 g/m$^2$ and then dried at room temperature for 2 hours to form the second coating. Then, ROSHIELD 3311 acrylic polymer emulsion was applied at 80-90 g/m$^2$ and dried at room temperature for another two hours to form a top coat. The resulting coated panel was touched and/or visual inspected, and then evaluated for anti-grain raising performance with ratings of 1-5 according to the area of grain raising:

| | |
|---|---|
| 5- | <1% of the area with raised grain; |
| 4- | 1%-5% of the area with raised grain; |
| 3- | >5%-15% of area with raised grain; |
| 2- | >15%-25% of the area with raised grain; |
| 1- | >25% of the area with raised grain. |

Anti-grain raising rating of 4 or higher is acceptable.

Anti-grain raising rating of 4 or higher is acceptable.

Sandability

An aqueous coating composition to be tested was applied on rubberwood at 80-90 g/m$^2$ and dried at room temperature for 2 hours. The resultant coating was then sanded. Sandability means how easy to get a smooth surface when sanding a coating. Sandability was rated on a scale of 1-5, based on the shape of dust created by sanding:

5—Powder; 4—Powder to strip; 3—Strip; 2—Large aggregate; and 1—Not sandable.

Sandability rating of 4 or higher is acceptable.

Clarity

Determine the clarity of coating films by visual inspection. If there is no haze observed to the naked eye, clarity is rated as "good". Otherwise, if a film shows haze, clarity is rated as "poor".

Preparation of Oligomer 76 ("O76")

Preparation of monomer emulsion: DISPONIL Fes-32 surfactant (38.55 g, 31% active) was dissolved in deionized water (227 g) with stirring. Then MMA, MAA, DAAM, and MMP, based on dosages described in Table 1, were slowly added into the resulting surfactant solution to obtain the monomer emulsion.

A solution containing DISPONIL Fes-32 surfactant (24.09 g, 31% active) and deionized (DI) water (1587.70 g) was added into a 4-neck, 5-liter round bottom flask equipped with a thermocouple, a cooling condenser and an agitator, and was heated to 85° C. under a nitrogen atmosphere. An aqueous initiator solution of APS (3.91 g APS in 56.48 g DI water) and 4.0% by weight of the monomer emulsion obtained above were then added into the flask. Within about 5 minutes (min), initiation of polymerization was confirmed by a temperature increase by 3° C. and a change of the external appearance of the reaction mixture. After heat generation stopped, an aqueous solution of $Na_2CO_3$ (1.66 g in 57.4 g DI water) was charged into reactor. And the remaining monomer emulsion was added gradually to the flask over a period of 40 min with stirring, and at the same time, an aqueous initiator solution of APS (1.64 g APS in 77.82 g DI water) was added gradually to the flask over a period of 50 min. And the temperature was maintained at 84-86° C. After the monomer emulsion and the initiator solution were consumed, the reaction mixture was held for 30 min. An aqueous ammonia solution (63.04 g, 25% active) was added into the reactor over 15 min and held for 20 min to dissolve or partially dissolve the obtained oligomer. Then deionized water was added to adjust the solids content of the oligomer O76 to around 25 wt %. Properties of the oligomer O76 are given in Table 2.

Preparation of Oligomer 20 ("O20")

Preparation of monomer emulsion: DISPONIL Fes-32 surfactant (26.02 g, 31% active) was dissolved in deionized water (153.11 g) with stirring. Then MMA, MAA, DAAM, and MMP, based on dosages described in Table 1, were slowly added into the resulting surfactant solution to obtain the monomer emulsion.

A solution containing DISPONIL Fes-32 surfactant (16.26 g, 31% active) and deionized water (900 g) was added into a 4-neck, 3-liter round bottom flask equipped with a thermocouple, a cooling condenser and an agitator, and was heated to 85° C. under a nitrogen atmosphere. An aqueous initiator solution of APS (2.64 g APS in 56.48 g DI water) and 4.0% by weight of the monomer emulsion obtained above were then added into the flask. Within about 5 min, initiation of polymerization was confirmed by a temperature increase by 3° C. and a change of the external appearance of the reaction mixture. After heat generation stopped, an aqueous solution of $Na_2CO_3$ (1.12 g in 39 g DI water) was charged into reactor. And the remaining monomer emulsion was added gradually to the flask over a period of 40 min with stirring, and at the same time, an aqueous initiator solution of APS (1.70 g APS in 80 g DI water) was added gradually to the flask over a period of 50 min. And the temperature was maintained at 84-86° C. After the monomer emulsion and the initiator solution were consumed, the reaction mixture was held for 30 min. An aqueous ammonia solution (46 g, 25% active) was added into the reactor over 15 min and held for 20 min to dissolve or partially dissolve the resulting oligomer. Then deionized water was added to adjust the solids content of the oligomer O20 to around 25 wt %. Properties of the obtained oligomer O20 are summarized in Table 2.

Preparation of Oligomers 21 and 22 ("O21" and O"22")

The oligomers of O21 and O22 were prepared according to the same procedure as described above for preparing the oligomer of O20, based on formulations described in Table 1.

The above obtained Oligomers (O76, O20, O21 and O22) were characterized by the test methods described above and characterization results are summarized in Table 2.

TABLE 1

| Ingredients used for Preparing Oligomers | | | | | |
|---|---|---|---|---|---|
| Oligomer | MMA (g) | DAAM (g) | MAA (g) | ST (g) | MMP (g) |
| O76 | 698.38 | 28.21 | 81.84 | 0 | 15.95 |
| O20 | 471.44 | 19.04 | 55.23 | 0 | 6.56 |
| O21 | 471.44 | 19.04 | 55.23 | 0 | 21.91 |
| O22 | 362.44 | 19.04 | 55.23 | 109.34 | 10.75 |

TABLE 2

| Properties of Oligomers | | | | | | |
|---|---|---|---|---|---|---|
| Oligomer | pH | Solids content (%) | Particle Size (nm) | Mn (g/mol) | Mw (g/mol) | Viscosity (cP) |
| O76 | 8.25 | 25.3 | 26 | 5480 | 12478 | 70 |
| O20 | 8.77 | 25.3 | N.A. | 5608 | 15517 | Too high |

TABLE 2-continued

| Properties of Oligomers | | | | | | |
|---|---|---|---|---|---|---|
| Oligomer | pH | Solids content (%) | Particle Size (nm) | Mn (g/mol) | Mw (g/mol) | Viscosity (cP) |
| | | | (clear solution) | | | (out of detection limit) |
| O21 | 8.21 | 24.9 | 30 | 2797 | 5518 | 68 |
| O22 | 8.94 | 25.1 | 103 | 4239 | 10482 | 1068 |

Coating Compositions Samples

Tables 3 and 4 list formulations for preparing coating composition samples with the amount of each component reported in grams (g). The components were mixed sequentially and stirred at 600 RPM to give aqueous coating composition samples. Solids content for each coating composition is also given in Tables 3 and 4. The obtained coating composition samples were characterized according to the test methods described above and characterization results are given in Table 5.

TABLE 3

| Coating Formulations | | | | | | | | | | | |
|---|---|---|---|---|---|---|---|---|---|---|---|
| Component | CE 1 | CE 2 | IE 1 | CE 3 | IE 3 | CE 4 | IE 2 | IE 4 | IE 5 | IE 6 | IE 7 |
| RS3311 | 70 | 70 | 70 | 75 | 70 | 70 | 70 | 70 | 70 | 70 | 70 |
| O21 | 11.2 | 11.2 | 9 | | 9 | 9 | 9 | 9 | 9 | 9 | 9 |
| BY16855 | 2.8 | | | | | | | | | | |
| OP-8550 | | 2.8 | | | | | | | | | |
| SPE-1 | 0 | 0 | 10 | 10 | 4 | | | | | | |
| SPE-2 | | | | | | 5 | | | | | |
| SPE-3 | | | | | | | 5 | | | | |
| SPE-4 | | | | | | | | 5 | | | |
| SPE-5 | | | | | | | | | 5 | | |
| SPE-6 | | | | | | | | | | 5 | |
| SPE-7 | | | | | | | | | | | 5 |
| DPM | 4 | 4 | 4 | 4 | 4 | 4 | 4 | 4 | 4 | 4 | 4 |
| DPnB | 4 | 4 | 4 | 4 | 4 | 4 | 4 | 4 | 4 | 4 | 4 |
| BYK346 | 0.5 | 0.5 | 0.5 | 0.5 | 0.5 | 0.5 | 0.5 | 0.5 | 0.5 | 0.5 | 0.5 |
| 902W | 0.3 | 0.3 | 0.3 | 0.3 | 0.3 | 0.3 | 0.3 | 0.3 | 0.3 | 0.3 | 0.3 |
| RM-8W | 0.5 | 0.5 | 0.5 | 0.5 | 0.5 | 0.5 | 0.5 | 0.5 | 0.5 | 0.5 | 0.5 |
| RM-5000 | 0.5 | 0.5 | 0.5 | 0.5 | 0.5 | 0.5 | 0.5 | 0.5 | 0.5 | 0.5 | 0.5 |
| Water | 6.2 | 6.2 | 1.2 | 5.2 | 7.2 | 6.2 | 6.2 | 6.2 | 6.2 | 6.2 | 6.2 |
| Total | 100 | 100 | 100 | 100 | 100 | 100 | 100 | 100 | 100 | 100 | 100 |
| Solids content, % | 30 | 30 | 30 | 30 | 30 | 30 | 30 | 30 | 30 | 30 | 30 |

TABLE 4

| Coating Formulations | | | | | | | | | | | | | |
|---|---|---|---|---|---|---|---|---|---|---|---|---|---|
| Component | CE 5 | CE 6 | IE 8 | CE 7 | IE 9 | IE 10 | IE 11 | IE 12 | IE 13 | IE 14 | IE 15 | IE 16 | IE 17 |
| RS3311 | 70 | 75 | 75 | 77 | 70 | 65 | 47 | 35 | 75 | 75 | 68 | 70 | 70 |
| O76 | | | 6 | 3.7 | 9 | 20.6 | 37.2 | 49.8 | | | 6.45 | 11.0 | 11.0 |
| O20 | | 6 | | | | | | | | | | | |
| O21 | | | | | | | | | 6 | | | | |
| O22 | 9 | | | | | | | | | 6 | | | |
| SPE-5 | 3.5 | 4.5 | 4.5 | 4.5 | 4.5 | 4.5 | 4.5 | 4.5 | 4.5 | 4.5 | 15 | | |
| SPE-9 | | | | | | | | | | | | 4.5 | |
| SPE-8 | | | | | | | | | | | | | 4.5 |
| DPM | 4 | 4 | 4 | 4 | 4 | 4 | 4 | 4 | 4 | 4 | 4 | 4 | 4 |
| DPnB | 4 | 4 | 4 | 4 | 4 | 4 | 4 | 4 | 4 | 4 | 4 | 4 | 4 |
| BYK346 | 0.5 | 0.5 | 0.5 | 0.5 | 0.5 | 0.5 | 0.5 | 0.5 | 0.5 | 0.5 | 0.5 | 0.5 | 0.5 |
| 902W | 0.3 | 0.3 | 0.3 | 0.3 | 0.3 | 0.3 | 0.3 | 0.3 | 0.3 | 0.3 | 0.3 | 0.3 | 0.3 |
| RM-8W | 0.5 | 0.5 | 0.5 | 0.5 | 0.5 | 0.5 | 0.5 | 0.5 | 0.5 | 0.5 | 0.5 | 0.5 | 0.5 |

TABLE 4-continued

| Coating Formulations | | | | | | | | | | | | | |
|---|---|---|---|---|---|---|---|---|---|---|---|---|---|
| Component | CE 5 | CE 6 | IE 8 | CE 7 | IE 9 | IE 10 | IE 11 | IE 12 | IE 13 | IE 14 | IE 15 | IE 16 | IE 17 |
| RM-5000 | 0.5 | 0.5 | 0.5 | 0.5 | 0.5 | 0.5 | 0.5 | 0.5 | 0.5 | 0.5 | 0.5 | 0.5 | 0.5 |
| Water | 7.7 | 4.7 | 4.7 | 5. | 6.7 | 0.1 | 1.5 | 0.9 | 4.7 | 4.7 | 0.75 | 4.7 | 4.7 |
| Total | 100 | 100 | 100 | 100 | 100 | 100 | 100 | 100 | 100 | 100 | 100 | 100 | 100 |
| Solids content, % | 32 | 31.5 | 31.5 | 31.7 | 30.2 | 31.2 | 28.2 | 26.6 | 31.5 | 31.5 | 30.0 | 31.5 | 31.5 |

As shown in Table 5, IEs 1 to 17 coating composition samples comprising the combination of specific SPEs and specific oligomers all provided coatings with excellent anti-grain raising performance, good sandability and good clarity.

In contrast, CEs 1 and 2 samples comprising no SPE and CE 3 containing no oligomer all showed unsatisfactory anti-grain raising properties. CE 4 sample comprising SPE-2 with a total number of 24 units of ($Me_2SiO$) and (MeSiRO) and CE 5 sample comprising 3.5 wt % of SPE-5 both failed to provide good anti-grain raising properties. CE 6 sample comprising an oligomer with too high Mw and CE 7 comprising 3 wt % of an oligomer both failed to meet the anti-grain raising requirement.

TABLE 5

| Properties of Coating Composition Samples | | | | |
|---|---|---|---|---|
| Coatings | Key component* | Anti-grain raising | Sandability | Clarity |
| IE 1 | RS3311 + 8 wt % O21 + 10 wt % SPE-1 | 4 | 3 | Good |
| CE 1 | RS3311 + 10 wt % O21 + 10 wt % BY16855 | 1 | 1 | Good |
| CE 2 | RS3311 + 10 wt % O21 + 10 wt % OP8550 | 2 | 1 | Good |
| CE 3 | RS3311 + 10 wt % SPE-1 | 3 | 3 | Good |
| IE 3 | RS3311 + 8 wt % O21 + 4 wt % SPE-1 | 4 | 3 | Good |
| CE 4 | RS3311 + 8 wt % O21 + 5 wt % SPE-2 | 3 | 3 | Good |
| IE 2 | RS3311 + 8 wt % O21 + 5 wt % SPE-3 | 4 | 3 | Good |
| IE 4 | RS3311 + 8 wt % O21 + 5 wt % SPE-4 | 4 | 3 | Good |
| IE 5 | RS3311 + 8 wt % O21 + 5 wt % SPE-5 | 4 | 3 | Good |
| IE 6 | RS3311 + 8 wt % O21 + 5 wt % SPE-6 | 4 | 3 | Good |
| IE 7 | RS3311 + 8 wt % O21 + 5 wt % SPE-7 | 4 | 3 | Good |
| CE 5 | RS3311 + 8 wt % O22 + 3.5 wt % SPE-5 | 2 | 3 | Good |
| CE 6 | RS3311 + 5 wt % O20 + 4.5 wt % SPE-5 | 3 | 3 | Good |
| IE 8 | RS3311 + 5 wt % O76 + 4.5 wt % SPE-5 | 4 | 3 | Good |
| CE 7 | RS3311 + 3 wt % O76 + 4.5 wt % SPE-5 | 3 | 3 | Good |
| IE 9 | RS3311 + 8 wt % O76 + 4.5 wt % SPE-5 | 4 | 3 | Good |
| IE 10 | RS3311 + 20 wt % O76 + 4.5 wt % SPE-5 | 4 | 3 | Good |
| IE 11 | RS3311 + 50 wt % O76 + 4.5 wt % SPE-5 | 4 | 3 | Good |
| IE 12 | RS3311 + 90 wt % O76 + 4.5 wt % SPE-5 | 4 | 3 | Good |
| IE 13 | RS3311 + 5 wt % O21 + 4.5 wt % SPE-5 | 4 | 3 | Good |
| IE 14 | RS3311 + 5 wt % O22 + 4.5 wt % SPE-5 | 4 | 3 | Good |
| IE 15 | RS3311 + 6 wt % O76 + 15 wt % SPE-5 | 4 | 3 | Good |
| IE 16 | RS3311 + 10 wt % O76 + 4.5 wt % SPE-9 | 4 | 3 | Good |
| IE 17 | RS3311 + 10 wt % O76 + 4.5 wt % SPE-8 | 4 | 3 | Good |

*Wt % of SPE is based on the weight of the aqueous coating composition.

Wt % of oligomer (by dry weight) is based on the weight of the acrylic polymer in RS3311, e.g., wt % of oligomer in IE1 is calculated by: [(Amount of O21 × Solids content of O21)/(Amount of RS3311 × Solids content of the acrylic polymer)] × 100%.

The invention claimed is:

1. An aqueous coating composition comprising:

(a) from 50% to 90%, by weight based on the weight of the aqueous coating composition, of a film-forming polymer;

(b) from 4% to 90%, by weight based on the weight of the film-forming polymer, of an oligomer having a weight average molecular weight of less than 15,000 g/mol, wherein the oligomer comprises, by weight based on the weight of the oligomer, from 1% to 20% of structural units of an acid monomer, a salt thereof, or mixtures thereof;

from zero to 20% of structural units of a monoethylenically unsaturated functional monomer carrying at least one of functional groups selected from an amide, carbonyl, ureido, silane, hydroxy, or amino group, or combinations thereof;

from 30% to 99% of structural units of a hydrophilic monoethylenically unsaturated nonionic monomer; and from zero to 30% of structural units of a hydrophobic monoethylenically unsaturated nonionic monomer; and (c) from 4% to 15%, by weight based on the weight of the aqueous coating composition, of a silicone polyether copolymer having the structure of formula (I):

$$R'—(CH_3)_2SiO—[(CH_3)_2SiO)]_x—[(CH_3)RSiO]_y—[(CH_3)_2SiO)]_z—Si(CH_3)_2—R' \quad (I)$$

where subscripts x, y and z have values such that x+y+z<24; R is $—(CH_2)_a$-$(EO)_b—(PO)_c—(BO)_d—OR_1$, where $R_1$ is H, $—CH_3$, or $CH_3CO—$; R' is $—(CH_2)_e(EO)_f(PO)_g—OH$, $—CH_3$, or $—CH_2CH_3$; subscript a is from 1 to 30, subscript b is from 1 to 30, subscript c is from zero to 30, subscript d is from zero to 30, subscript e is from zero to 30, subscript f is from zero to 30, and subscript g is from zero to 30; EO is $—(CH_2CH_2—O)—$; PO is $—(CHR_2—CHR_3—O)—$, where $R_2$ and $R_3$ are each independently hydrogen or —$CH_3$, provided that $R_2$ and $R_3$ together contain 1 carbon atom; and BO is —($CHR_4$—$CHR_5$—O), where $R_4$ and $R_5$ are each independently hydrogen, —$CH_3$, or —$CH_2CH_3$, provided that $R_4$ and $R_5$ together contain 2 carbon atoms.

2. The aqueous coating composition of claim 1, wherein the oligomer comprises, by weight based on the weight of the oligomer, from 6% to 18% of structural units of the acid monomer, the salt thereof, or mixtures thereof.

3. The aqueous coating composition of claim 1, wherein the hydrophilic monoethylenically unsaturated nonionic monomer is selected from methyl (meth) acrylate, ethyl (meth) acrylate, or mixtures thereof.

4. The aqueous coating composition of claim 1, comprising, by weight based on the weight of the film-forming polymer, from 5% to 15% of the oligomer.

5. The aqueous coating composition of claim 1, wherein the oligomer has a weight average molecular weight of from 5,000 to 12,500 g/mol.

6. The aqueous coating composition of claim 1, wherein the oligomer comprises, by weight based on the weight of the oligomer, from 7% to 15% of structural units of the acid monomer, the salt thereof, or mixtures thereof, from 1% to 5% of structural units of the monoethylenically unsaturated functional monomer selected from diacetone acrylamide or acetoacetoxyethyl methacrylate, from 60% to 92% of structural units of the hydrophilic monoethylenically unsaturated monomer, and from zero to 20% of structural units of the hydrophobic monoethylenically unsaturated monomer.

7. The aqueous coating composition of claim 1, wherein the silicone polyether copolymer has the structure of formula (I), where the value of x+y+z is in a range of from 1 to 15.

8. The aqueous coating composition of claim 1, wherein the film-forming polymer is an acrylic polymer.

9. The aqueous coating composition of claim 1, wherein the silicone polyether copolymer is present at a concentration of from 4.5% to 10% by weight based on the weight of the aqueous coating composition.

10. The aqueous coating composition of claim 1, further comprising a polyfunctional carboxylic hydrazide containing at least two hydrazide groups per molecule.

11. A process for preparing the aqueous coating composition of claim 1, comprising: admixing the film-forming polymer, the oligomer, and the silicone polyether copolymer.

* * * * *